United States Patent
Wakabayashi

[11] Patent Number: 5,827,027
[45] Date of Patent: Oct. 27, 1998

[54] NUT FREE FROM INADVERTENT LOOSENING AND A METHOD OF MAKING SAME

[75] Inventor: Katuhiko Wakabayashi, Osaka, Japan

[73] Assignee: Hard Lock Kogyo Co., Osaka, Japan

[21] Appl. No.: 870,400

[22] Filed: Jun. 6, 1997

[51] Int. Cl.⁶ .................................................. F16B 37/04
[52] U.S. Cl. ........................ 411/283; 411/277; 411/280
[58] Field of Search ..................................... 411/276, 277, 411/280–286

[56] References Cited

U.S. PATENT DOCUMENTS

| | | | |
|---|---|---|---|
| 2,452,192 | 10/1948 | Hosking | 411/283 |
| 2,923,339 | 2/1960 | Skidmore | 411/227 |
| 3,621,502 | 11/1971 | Velthoven . | |
| 3,734,156 | 5/1973 | Beard | 411/283 |

FOREIGN PATENT DOCUMENTS

| | | | |
|---|---|---|---|
| Sho. 48-15139 | 5/1973 | Japan . | |
| Sho. 55-44126 | 3/1980 | Japan . | |
| Hei. 3-7806 | 2/1991 | Japan . | |
| 0580325 | 9/1946 | United Kingdom | 411/280 |
| 0587485 | 4/1947 | United Kingdom | 411/277 |
| 6121183 | 11/1948 | United Kingdom | 411/280 |

*Primary Examiner*—Flemming Saether
*Attorney, Agent, or Firm*—Fisher, Christen & Sabol

[57] ABSTRACT

A nut free from inadvertent loosening has an annular lug with a plurality of generally upright grooves formed in an outer peripheral surface of the annular lug at angular intervals so as to divide the annular lug into a plurality of wall segments. Each wall segment is interposed between two upright grooves. At least one of the wall segments is depressed centripetally to reduce its radius, with the other segments remaining undepressed. The annular lug is integral and coaxial with a base which is engageable with a driver. An internally threaded bore is formed through the nut around a central axis thereof. The annular lug provides an upper zone of the internally threaded bore. The internal thread is continuous from end to end and is not intersected by the vertical grooves. The inner radius of each depressed wall segment is less than the inner radius of the undepressed wall segments. The outer radius of each depressed wall segment may be greater than or less than the outer radius of the undepressed wall segments.

14 Claims, 7 Drawing Sheets

NUT FREE FROM INADVERTENT LOOSENING AND A METHOD OF MAKING SAME

BACKGROUND OF THE INVENTION

1. Field of the Invention

The present invention relates to a nut free from any inadvertent loosening and also to a method of making such a nut.

2. Description of Prior Art

This kind of nuts are designed to be protected from their unwanted loosening on bolts, without need of any special washer or the like, so that they have been widely used in various fields.

In one of the prior art nuts such as disclosed in the Japanese Patent Publication ("JPP") Hei. 3-7806 (1991), radial outputs are formed in the nut body around an outer end region of its threaded bore. Some convolutions of the nut thread are divided into several segments, and each segment has its trailing end ( seen in the direction of fastening) depressed inwardly towards the periphery of bolts on which the nuts are to be held. Those trailing ends will bite the bolt thread when the nut inadvertently tends to rotate in reverse direction to become loosened. This structure is effective to prevent the nuts from unintentionally loosening, though the formation of such radial outputs requires much time and labor to raise manufacture cost. However, it is not necessarily easy to form those outputs at a satisfactory precision and reliability. Further, the bolt threads may be damaged more or less when bitten or scratched by the trailing ends.

In another prior art example shown in JPP Sho. 48-15139, a nut body has integral therewith a cylindrical collar that is depressed towards each other by a pair of recessed dies. An elliptic collar thus formed will sufficiently protect at first in early stages the nut from its unintentional loosening, but this effect will soon become poorer as this nut is repeatedly set on and removed from a bolt. This is because such repeated elastic deformation of the elliptic collar will leave an considerable permanent plastic strain as a whole in its metallurgical fine texture elements, almost restoring its original round cross section that will no longer be able to inhibit the nut from loosening.

In still another example disclosed in the Japanese reexamined Patent Publication Sho. 55-44126, parallel and discrete grooves are formed in helical direction at regular angular intervals in a tapered end portion of a nut. This end portion is then pressed centripetally so that its inner effective diameter is rendered somewhat smaller than that of main nut portion such that said parallel grooves can be brought into a strong forced mesh with the male thread of a bolt. Such a thanked end portion of the nut is resilient enough to ensure a sufficient effect of inhibiting the unintentional loosening of the nut, even if attachment and detachment thereof are repeated many times. However the bolt's male thread may possibly catch the parallel discrete grooves and jam the nut.

SUMMARY OF THE INVENTION

Therefore, an object of the present invention is to provide a nut free from its any unintentional loosening and capable of being produced inexpensively and efficiently for practical uses. Another object is to provide a method of making such a nut.

According to the present invention, the nut comprises an internally threaded bore formed through the nut around a central axis thereof, a base engageable with a driver, an annular lug integral with and extending upwardly from the base, the annular lug being coaxial with the base and providing an upper zone of the internally threaded bore, and a plurality of generally upright grooves formed in an outer peripheral region of the annular lug at angular intervals so as to divide the annular lug into a plurality of wall segments having radii and each interposed between one of the upright grooves and the next, wherein at least one of the wall segments is depressed centripetally to reduce its radius to a slight degree, with the other segments remaining undepressed. Each upright groove intervening between the wall segment to be depressed and the adjacent one not to be depressed. The former segment can thus be depressed smoothly to a desired extent at an improved productivity and at a lowered manufacture cost, without incurring any undesirable deformation of the latter segment. In use, the depressed wall segments of reduced radii will elastically expand as the nut is screwed to and fastened on a bolt, due to resiliency of the upright grooves. With the nut being removed from the bolt, the resiliency of said upright grooves will allow the depressed wall segments to recover their natural, that is, unexpanded state. The internal thread extending through the nut is continuous from end to end, thus protecting the nut from jamming.

Preferably, the wall segments depressed and those not depressed do alternate one another such that each of the former intervenes between every two of the latter, and all the segments are arranged at regular angular intervals around threaded bore. This feature is advantageous in that centripetal pressing forces imparted to the wall segments of a semi-finished nut will cancel each other. In such a case, simple structure will suffice to support the semi-finished nut during the depression process, with all segments to be depressed being uniformly deformed to the same extent. In operation, forced friction appearing between the depressed wall segments and the bolt's outer periphery are distributed symmetrically with each other with respect to the central axis of the nut. Consequently, the central axis of the nut is protected from offset from that of the bolt, and the nut can now be fastened easily and smoothly without encountering any unevenness in frictional stress around the axis. Typically, the number of the depressed wall segments may be three, but can be two, four or more.

Also preferably, the outer radius of each depressed wall segment is greater than that of each undepressed one at least in a state that the former segments are not yet subjected to a centripetal deformation process. The wall segments to be depressed will thus have their outer sides protruding centrifugally beyond those of wall segments not to be depressed. This feature affords an advantage that the former segments can be centripetally pressed easily.

In a case wherein the annular lug is of a frustum shape having a diameter reducing towards its upper end, the press die can readily fit on the frustum to smoothly deform the wall segments, thereby further improving productivity and lowering manufacture cost. In addition, it is able to accurately control the extent of centripetal deformation by adjusting the stroke of the press die in the axial direction. The upper region of the frustum has a so thanked wall thickness that the depressing of said region is rendered easier.

The nut free from unintentional loosening may preferably be manufactured by the following process. This process may comprises of: the step of preparing a half-finished nut comprising a base engageable with a driver , an annular lug of a frustum shape extending upwards from and coaxially with the base, an internally threaded bore formed through the nut around a central axis thereof, and a plurality of upright grooves formed in an outer peripheral region of the annular lug at angular intervals so as to provide wall segments each between one upright groove and the next;

the subsequent step of fitting a press die on the annular lug of the semi-finished nut from an upper end thereof, the press die having a tapered internal protrusion engageable with an outer side of at least one of the wall segments; and the final step of thrusting the press die downwardly along the central axis towards the base so as to depress said at least one wall segment, thereby reducing the radius thereof towards the central axis.

According to this method, the tapered internal protrusion of the press die acts as a kind of wedge such that the wall segment is or segments are strongly pressed towards the axis to be surely deformed to a desired extent. The press die may be driven synchronously and in harmony with the transportation of the semifinished nuts, thereby enhancing efficiency in manufacture of the nuts of any designed and desired quality. It is possible to linearly control the axial stroke of the die having such a tapered protrusion engageable with the annular lug so as to achieve a precisely predetermined depression degree. The upright grooves each intervening between the wall segment to be depressed and the adjacent one not to be depressed will serve to protect the latter segment from depression.

THE PREFERRED EMBODIMENTS

Now referring to the drawings, some embodiments of the present invention will be described below. FIGS. 1 to 5 show a nut 1 free from unintentional loosening and provided in a first embodiment to comprise a base 2 of a hexagonal outer periphery. This base is adapted-to engage with a driver or driving tool such as a spanner. Protruding upwards from the base 2 is an annular lug 3, which is formed integral with said base by a proper process such as the cold forging or hot forging.

Figure 1:
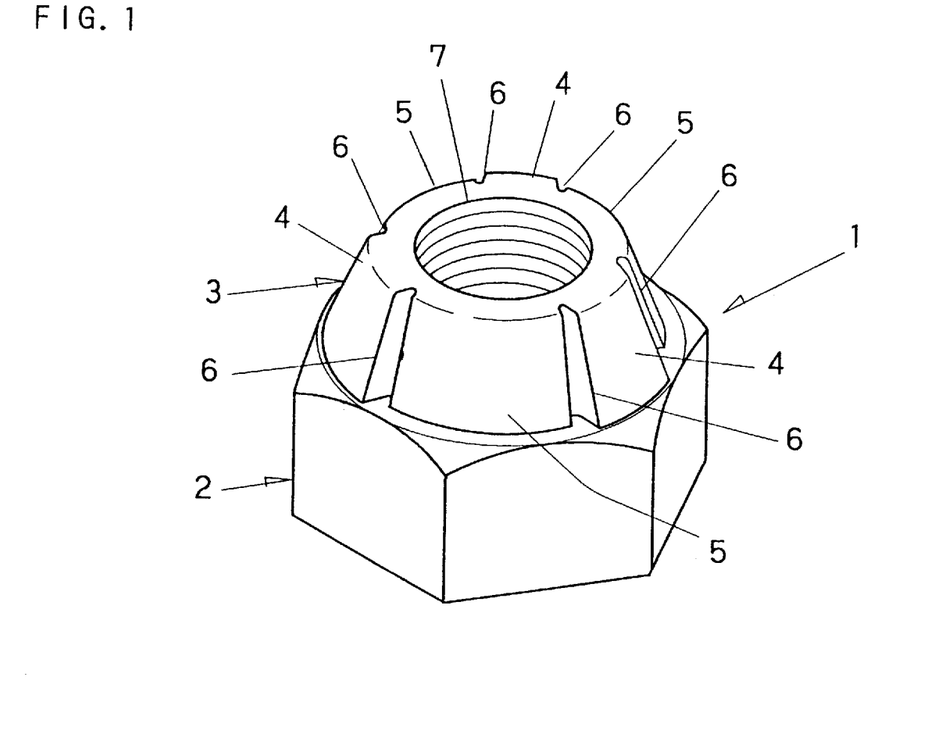
FIG. 1 is a perspective view of a nut having an annular lug and free from unintentional loosening, with the nut being provided in a first embodiment but shown in its state not yet depressed inwardly.
Figure 2:
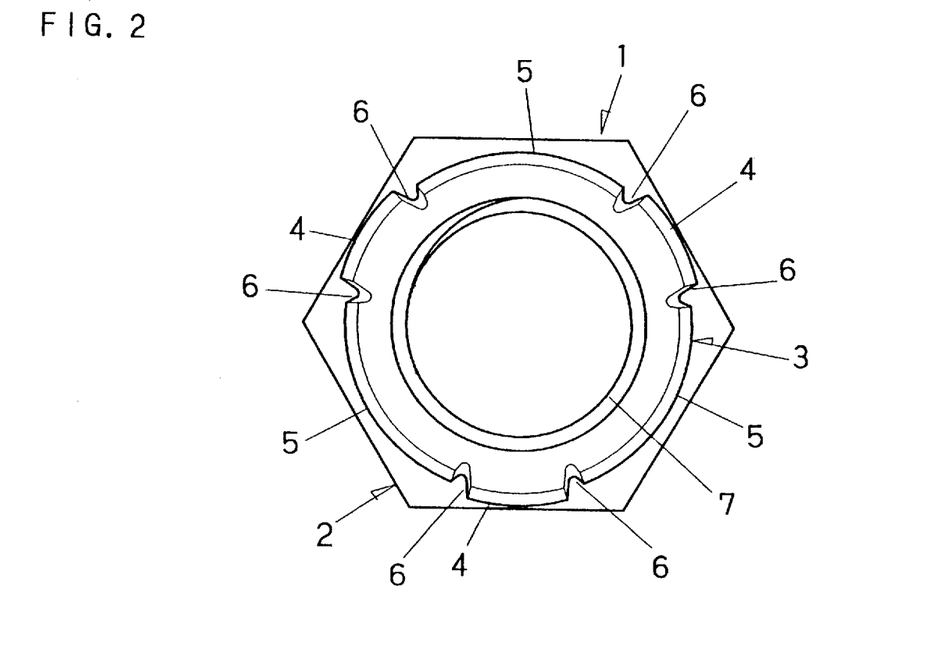
FIG. 2 is a plan view of the semi-finished nut shown in FIG. 1.
Figure 5:
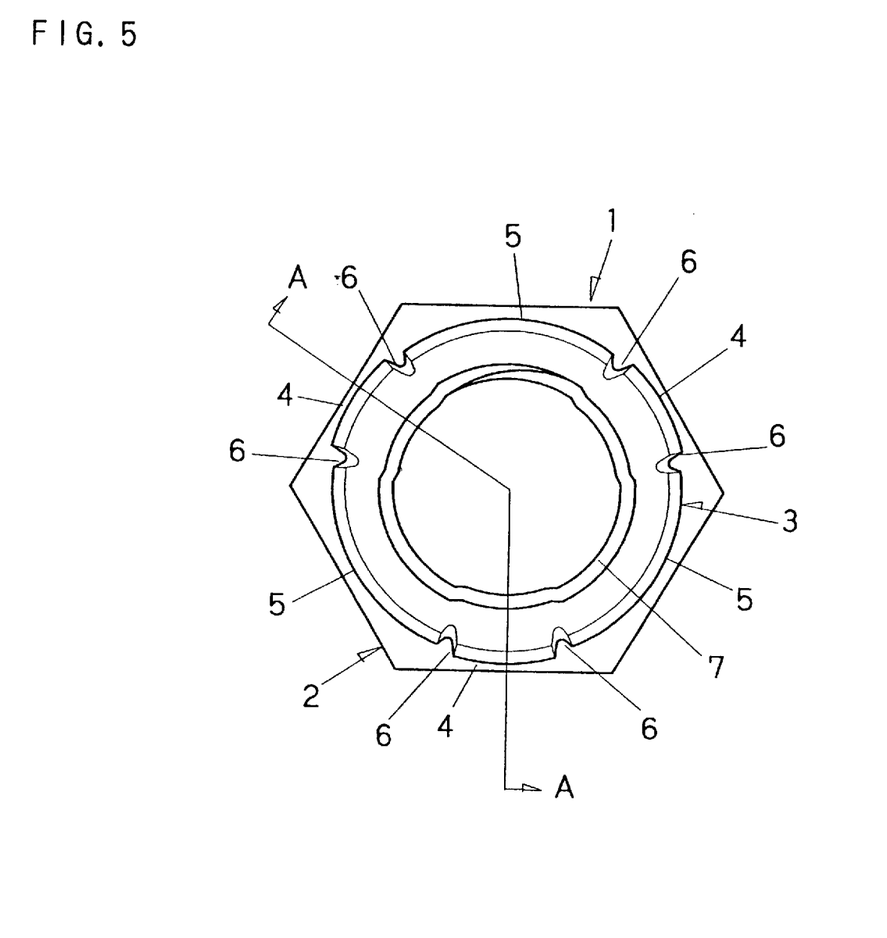
FIG. 5 is a plan view of the nut in FIG. 1, but shown in its finished state after the inward depression of the annular lug.

The annular lug 3 is frustum-shaped to gradually reduce diameter towards its upper end. Grooves 6 are formed upright in the outer periphery or surface of the lug, thereby drowning wall segments 4 and 5 each between two of the adjacent upright grooves. The grooves 6 extending from bottom to top of the annular lug 3 are generally U-shaped in cross section may be formed simultaneously with the cold forging thereof. As shown in FIGS. 1, 2, and 5, the upright grooves 6 divide the angular lug at intervals into a plurality of wall segments 4,5 without intersecting the internally threaded bore 7.

A bore 7 penetrating the nut comprising of the base 2 and annular lug 3 is female threaded.

In this embodiment, the number of upright grooves 6 is six, as seen in FIG. 2. Those grooves are arranged to provide three pairs thereof such that each pair defines one segment 4 whose width in circumferential direction is nearly a half of that of the other segment 5 adjacent to the one segment 4.

The narrower segments 4 are slightly depressed in a centripetal manner after forming the female threaded bore 7 through the nut. Thus, the inner radius of each arc portion of the female thread included in each narrower segment 4 is rendered slightly smaller than that of each broader segment 5. Such reduced inner radii of the narrower segments 4 may be deemed a "partial shrinkage" of the female thread as a whole, and are effective to prevent the nut from unintentionally loosening itself.

The number of those depressed narrower segments 4, which are disposed at regular angular intervals around the nut's bore, is three in this embodiment.

On the other hand, the outer radii of the depressed segment 4 are however still greater a little than the undepressed other segments 5.

The nut described above may be manufactured in the following advantageous manner.

A metal block will be cold forged to give a raw nut that comprises a hexagonal base 2, an annular lug 3 and an unthreaded bore. This bore penetrates these base and lug aligned with each other along a common axis. The annular lug 3 protruding from the base is a hollow frustum having a diameter reduced towards its free end. Six upright grooves 6 extending along said axis are formed at the same time as the raw nut is cold forged. Such an annular lug 3 will have its wall segments 4 to be depressed later as well as other segments 5 not to be so done, with the former segments being of outer radii greater than that of the latter. The bore in the raw nut will then be female threaded to give a semi-finished nut 9 that is subject to the next step of depressing ( viz., caulking) the selected wall segments. The female thread 7 in the semi-finished nut has an inner or crest diameter 'P' ( corresponding to the valley diameter of a mating male thread) that is uniform at this stage over its full length and all around its axis.

Figure 4:
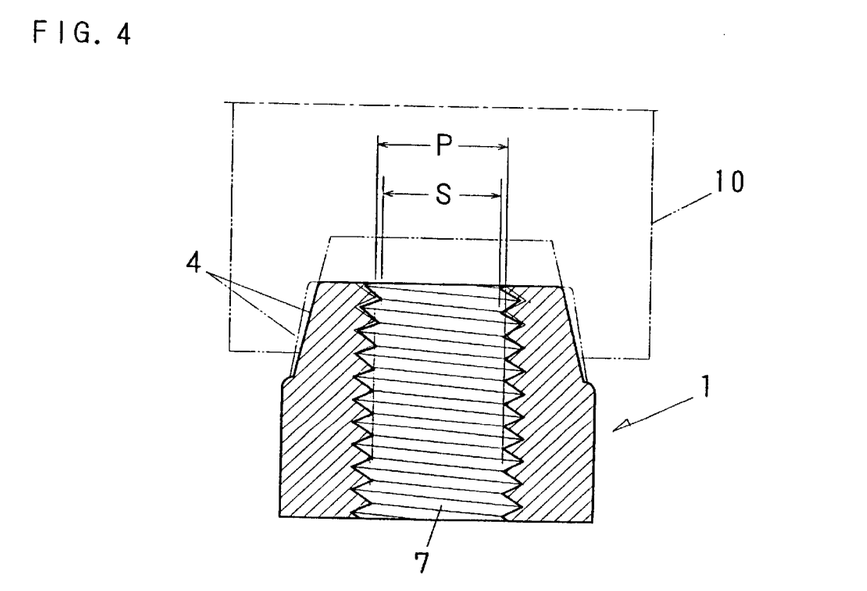
FIG. 4 is a cross section taken along the line A—A in FIG. 5.

The semi-finished nut 9 will be transported by a conveyor or the like to a pressing machine where the narrower wall segments 4 are forcibly bent inward towards the axis. This pressing machine comprises a die 10 that has a recess 11 fittable on the lug 3 of the nut 1 and is driven to vertically reciprocate. Therefore, a series of semi-finished nuts 9 will be processed one by one to have their lugs' wall segments deformed inwardly a predetermined angle. Due to this process, the inner diameter P of the female thread will decrease to S with respect to the narrower segments 4 as seen in FIG. 4. With such a small radial deformation thereof being given as ds, the diameters P and S will satisfy an equation:

$$P = S + 2\underline{ds}.$$

Figure 3:
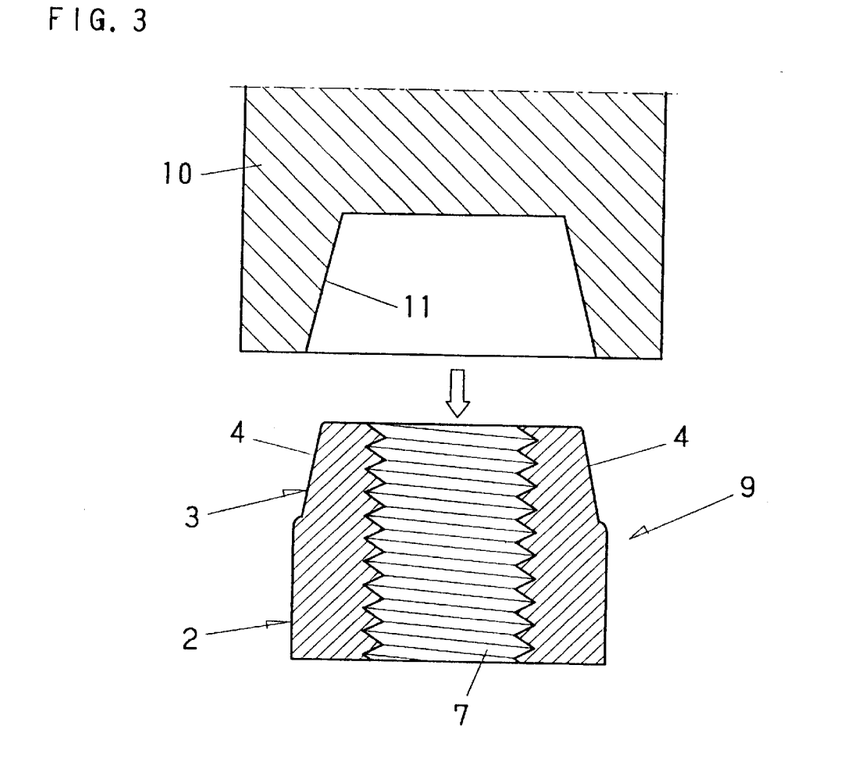
FIG. 3 is a vertical cross section illustrating the process of finishing the nut shown in FIG. 1.

The surface of the recess 11 is also frustum-shaped so as to closely contact the outer curved sides of the wall segments 4. A tapered peripheral wall of the recess 11 will forcibly cause them to permanently deform inwards, as the press die strokes a given distance.

The stroke of the press die can be adjusted easily and very accurately to assure a desired deformation of the selected wall segments 4. Therefore, quality and productivity of the nuts provided herein are much improved as compared with the prior art ones.

The nut free from unintentional loosening described above may be modified in various manners.

Figure 6:
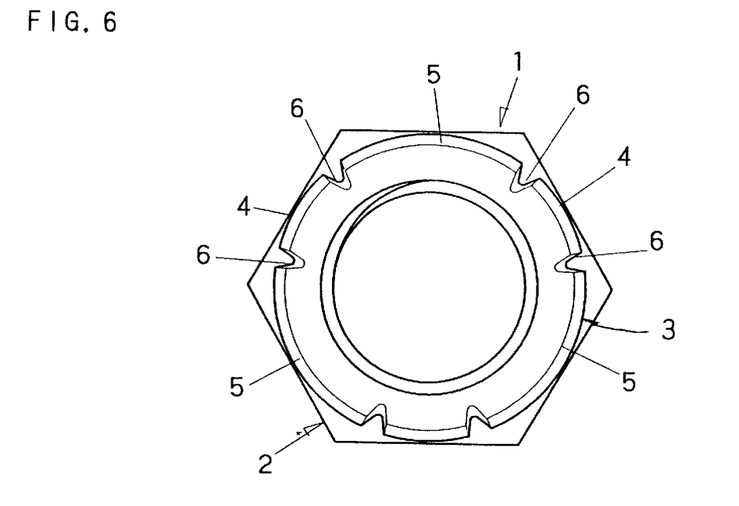
FIG. 6 is also a plan view of another nut provided in a second embodiment and shown in its unfinished state.
Figure 7:
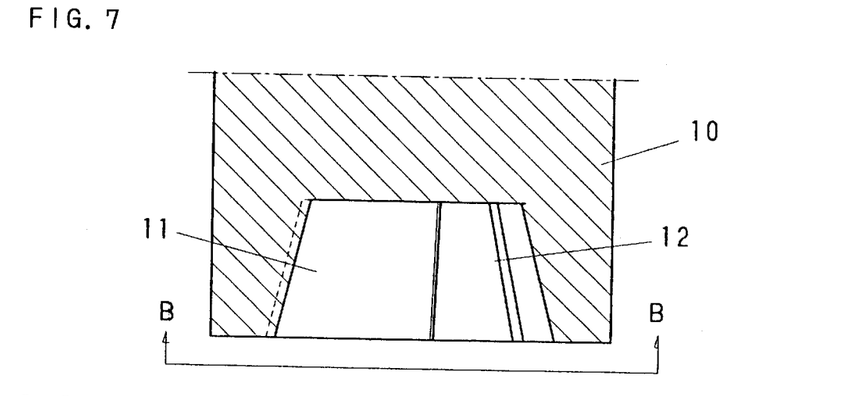
FIG. 7 is a vertical cross section of a die used to finish the nut shown in FIG. 6.
Figure 8:
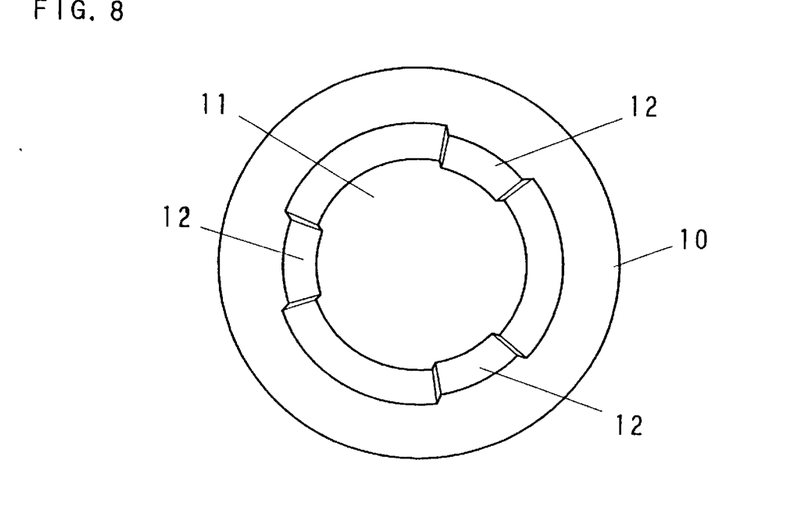
FIG. 8 is a bottom view of the die seen in the direction B—B in FIG. 7.

For instance, the two kinds of wall segments 4 and 5 in the semi-finished nut 9 can be of the same diameter, as shown in FIG. 6. In this case, another type of press die 10 will be used to obtain a finished nut 1, wherein the inner surface of die recess 11 has tapered protrusions 12 as seen in FIGS. 7 and 8. Those protrusions will urge inwards only the narrower wall segments 4 when the die is thrust towards the nut's base. Preferably, such protrusions 12 may be of the same size as the wall segments 4.

Figure 9:
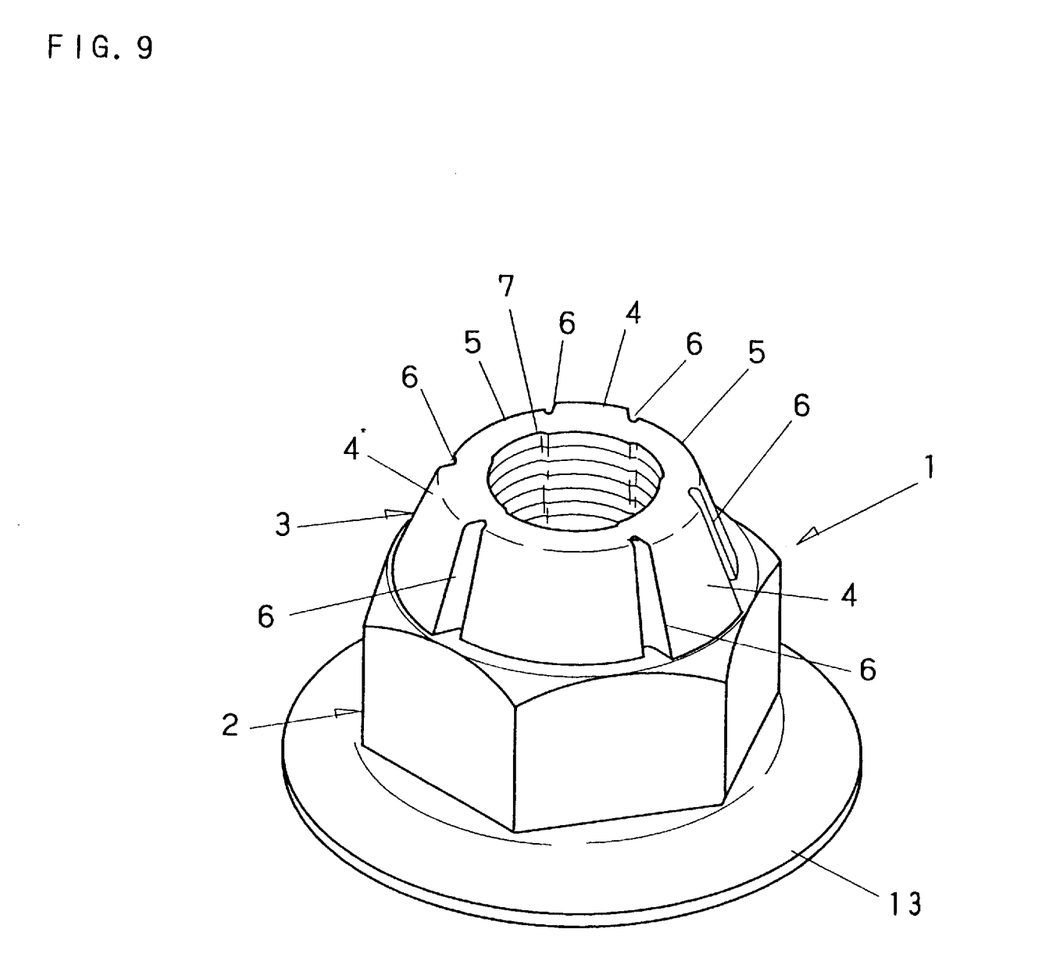
FIG. 9 is a perspective view of a further nut provided in a third embodiment and shown in its finished state.

The base 2 of any nut 1 mentioned above may have an integral flange 13 at its bottom, as illustrated in FIG. 9.

Figure 10:
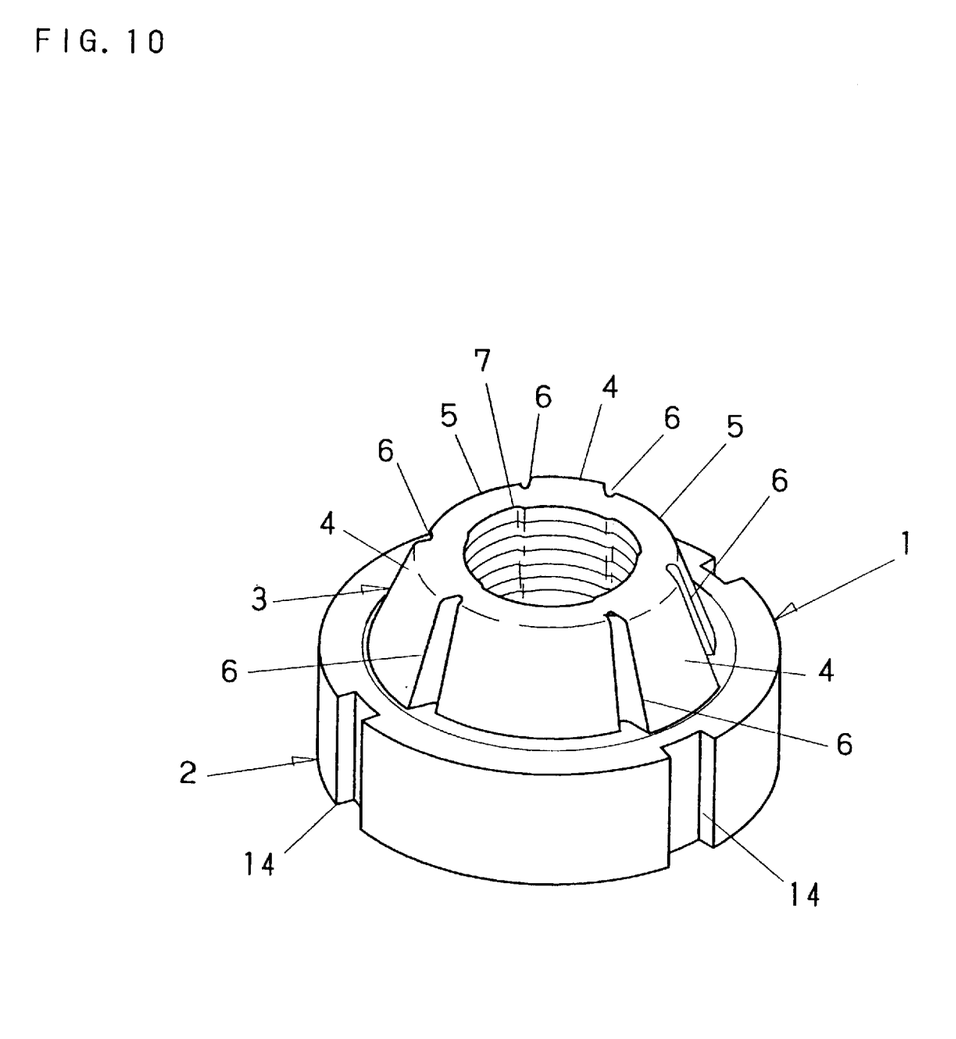
FIG. 10 is similarly a perspective view of a still further nut provided in a fourth embodiment and shown in its finished state.

Further, in another modification, as shown in FIG. 10, the hexagonal base 2 of the nut 1 may be replaced with a short cylinder having sharp vertical grooves 14 engageable with a wrench or the like.

Figure 11:
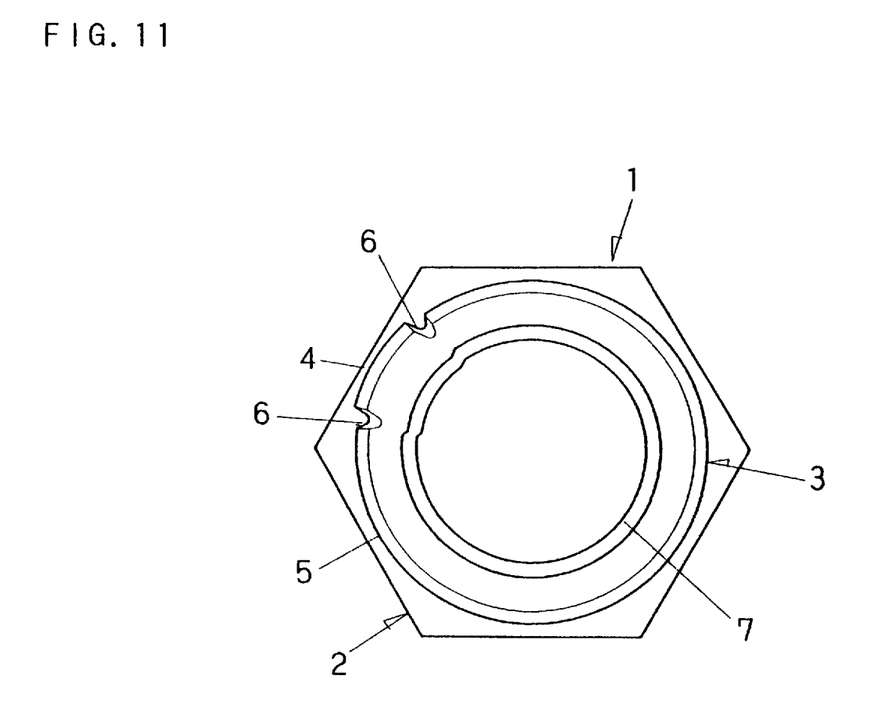
FIG. 11 is a plan view of yet another nut provided in a fifth embodiment and shown in its finished state.

In still another modification of the present invention, as shown in FIG. 11, there is formed merely one pair of upright grooves 6 to deform only one wall segment 4 of the annular lug.

What is claimed is:

1. A nut free from inadvertent loosening comprising:
    an internally threaded bore formed through the nut around a central axis thereof;
    a base engageable with a driver;
    an annular lug integral with and extending upwardly from the base;
    the annular lug being coaxial with the base and providing an upper zone of the internally threaded bore; and
    a plurality of generally upright grooves formed in an outer peripheral surface of the annular lug at angular intervals so as to divide the annular lug into a plurality of wall segments having radii and each interposed between one of the upright grooves and the next, said grooves not intersecting said internally threaded bore,
    wherein at least one of the wall segments is depressed centripetally to reduce its radius, with the other segments remaining undepressed, and said at least one depressed wall segment alternates with said undepressed wall segments.

2. A nut as claimed in claim 1, wherein the number of depressed wall segments is three, and the depressed wall segments are arranged at regular angular intervals around the threaded bore.

3. A nut as claimed in claim 1, wherein the number of the depressed wall segments is one.

4. A nut as claimed in claim 1, wherein an outer radius of each depressed wall segment is greater than that of each undepressed one when the former segments are not yet subjected to a centripetal deformation process.

5. A nut as claimed in claim 1, wherein an outer diameter of the annular lug decreases gradually towards an upper end thereof so that the lug is of a frustum shape.

6. A nut as claimed in claim 1 wherein the internal thread through the nut is continuous from end to end.

7. A nut as claimed in claim 1 wherein said grooves are generally U-shaped in cross-section.

8. A nut as claimed in claim 1 wherein the outer radius of each of said at least one depressed wall segment is greater than the outer radius of each of said undepressed wall segments.

9. A nut as claimed in claim 1 wherein prior to said centripetal depression said at least one depressed wall segment has the same outer radius as the radius of said undepressed wall segments.

10. A nut as claimed in claim 1 wherein said base has an integral flange at its bottom.

11. A nut as claimed in claim 1 wherein said base has vertical grooves.

12. A nut free from inadvertent loosening comprising:
    an internally threaded bore formed through the nut around a central axis thereof;
    a base engageable with a driver;
    an annular lug integral with and extending upwardly from the base;
    the annular lug being coaxial with the base and providing an upper zone of the internally threaded bore, said annular lug comprising a plurality of generally upright grooves and a plurality of wall segments having radii, said wall segments being interposed between said upright grooves, said grooves dividing said annular lug at angular intervals into said plurality of wall segments without intersecting said internally threaded bore,
    wherein at least one of the wall segments is depressed centripetally to reduce its radius, with the other segments remaining undepressed, the inner radius of said at least one wall segment being less than the inner radius of the undepressed wall segments.

13. A nut as claimed in claim 12 wherein the outer radius of said at least one depressed wall segment is greater than the outer radius of said undepressed wall segments.

14. A nut as claimed in claim 12 wherein the outer radius of said at least one depressed wall segment is less than the outer radius of said undepressed wall segments.

* * * * *